Feb. 3, 1942.                D. RAY                2,271,714
METHOD OF MAKING LAMINATED FLEXIBLE CONTAINERS
Filed Feb. 6, 1939
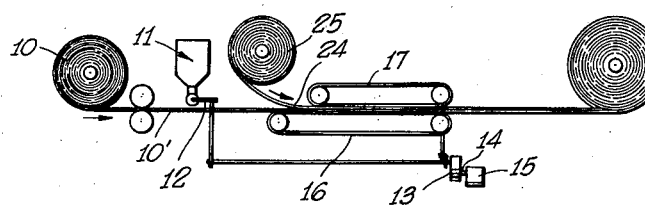
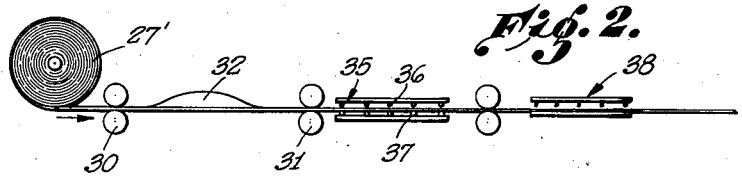
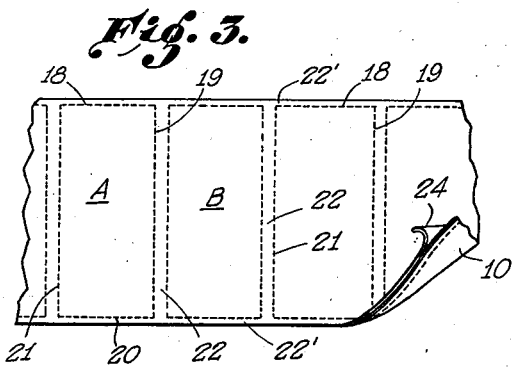
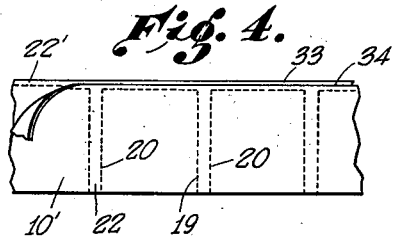
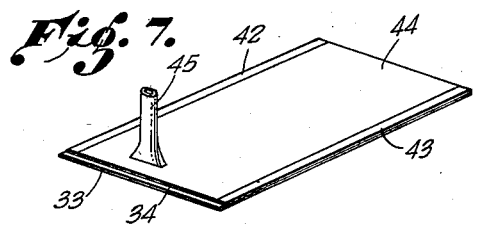
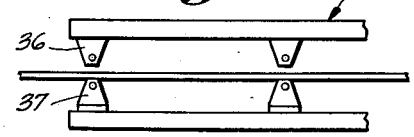
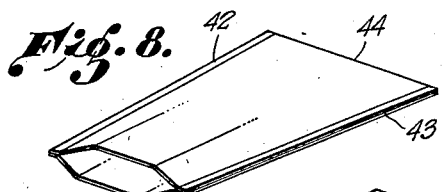
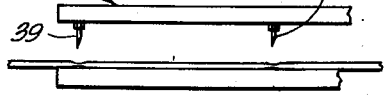
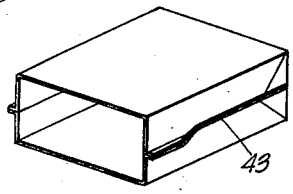
DON RAY
INVENTOR.
BY
ATTORNEY.

Patented Feb. 3, 1942

2,271,714

UNITED STATES PATENT OFFICE 2,271,714

METHOD OF MAKING LAMINATED FLEXIBLE CONTAINERS

Don Ray, Beverly Hills, Calif.

Application February 6, 1939, Serial No. 254,806

7 Claims. (Cl. 93—35)

This invention pertains to a method of making bag-like containers in a rapid, economical and facile manner.

Generally stated, the bag-like containers made by the method of this invention comprise a unitary outer sheet of fibrous material and an inner layer of sheet rubber of vulcanizable form, these two sheets being then held together by means of a bonding adhesive. The adhesive is not coextensive with the sheets, however, but instead is spaced from the edges of the sheet. Such sheet is then folded upon itself so as to place the rubber liner in substantial contact and edges of the folded sheet are vulcanized together by the application of heat to limited areas, the resulting bag-like container being adapted for use in any suitable manner.

Bag-like containers of the character stated are particularly adapted for use in packing food stuffs such as dried fruit, prunes, frozen foods, coffee, tea and other articles having volatile constituents since after the material to be packed is placed into the container, the container and its contents may be subjected to vacuum and then sealed while under vacuum. When such filled and sealed container is then removed from the vacuum chamber, ordinary atmospheric pressure presses the container closely around its contents, thereby reducing the degree of vacuum contained in the bag and preventing vacuum distillation of volatile ingredients from the contents.

An object is to disclose and provide methods of manufacturing bag-like laminated containers in a continuous manner.

A further object is to provide a construction of bag-like containers in which bonding adhesives do not interfere with the subsequent storage, stacking or handling of the bags.

Other objects, uses, advantages and adaptations of the invention will become apparent to those skilled in the art from the following detailed description.

In order to facilitate understanding, reference will be had to the appended drawing, in which:

Fig. 1 and Fig. 2 are diagrammatic side elevations of arrangments of elements which may be employed in manufacturing the bags of this invention.

Fig. 3 is a plan view of the sheet produced in Fig. 1.

Fig. 4 is a plan view of a folded sheet produced during one of the steps disclosed in Fig. 2.

Fig. 5 is an enlarged side elevation illustrating a vulcanizing operation.

Fig. 6 is a side elevation of a cutting operation.

Figs. 7, 8 and 9 illustrate various positions of the bag-like container during forming.

As generally indicated hereinabove, the bag-like containers made by the method of the present invention are particularly adapted for use with food stuffs or substances having volatile constituents. The containers may also be employed on frozen foods, dried foods, mayonnaise, ice cream, and a great variety of other products. The utility of the bag will become apparent to those skilled in the art from the description given hereinafter.

A continuous method of making containers of this invention is illustrated in the drawings. As shown in Fig. 1, for example, a continuous strip of fibrous material such as paper, of a desired weight and body, may be supplied from a feed roll 10 to a device 11 adapted to apply an adhesive to one surface of such fibrous strip. The device indicated at 11 includes a reservoir and a feeding head provided with a slot of desired width, such feeding head containing a rotary valve, the valve being actuated by a lever 12 connected to a cam or other suitable operating mechanism indicated at 13. Such mechanism is preferably driven as, for example, by shaft 14 and a motor 15, said motor being also used in driving feeding belts 16 and 17. The coating device is described in detail in my co-pending application Serial No. 249,574 entitled "Improvements in coating methods and machines."

The adhesive is applied to the continuously moving backing strip 10' intermittently so as to form transversely extending areas spaced apart from the other by narrow uncoated areas. Moreover, the adhesive is preferably applied in an area which is spaced from the edges of the strip 10'. By referring to Fig. 3, the numerals 18, 19, 20 and 21 define the edges of a single area of adhesive applied to the backing strip 10' and it is to be noted that the area A is separated from the adjoining area B by an uncoated narrow strip, generally indicated by the numeral 22.

By again referring to Fig. 1, the coated surface of the backing strip 10' is then covered by a strip of vulcanizable rubber or composition containing vulcanizable rubber. This strip is generally indicated at 24 and is supplied from a roll 25, such strip being compressed against the coated surface of the backing strips by means of the belt 17. A suitable material composed largely of vulcanizable or thermoplastic material capable of bonding together under the influence of heat is available on the market under the name "Pliofilm" (Goodyear Rubber Co.). The adhesives best adapted for use with such vulcanizable rubber are rubber halide compositions or rubber cements which remain tacky for indefinite periods of time.

The combined strips may then be wound upon a take-up roll 27. In making bags from such combined strips, the general steps and arrangements illustrated in Fig. 2 may be employed. For example, the combined strip may now be fed from the roll 27' by suitable feeding mechanism as indicated at 30 and 31, through a folding unit 32. In the folding unit the continuous composite strip is folded longitudinally into the position indicated in Fig. 4, the rubber sheet or strip 24 thus being brought in contact with itself. In such folding operation one longitudinal edge of the combined strip is permitted to extend beyond the other longitudinal edge. For example, in Fig. 4 the edge 33 extends beyond the edge 34. The folded blank then passes beneath a vulcanizing unit, indicated generally at 35, and shown in greater detail in Figs. 4 and 5. The blank of material is periodically stopped and heating elements 36, 37, etc., are brought down over the uncoated transversely extending areas 22 and 22', the heat and pressure thus applied to the combined strip vulcanizing the rubber strip or sheet 24 to itself along such areas. The folded strip is then intermittently advanced to a cutting means, generally indicated at 38 and shown in more detail in Fig. 6. A movable, vertically reciprocable platen carries the knives 39, 40, etc., which cut the folded and vulcanized strip into sections, the cutting being done along the previously vulcanized transverse areas. The cuts are therefore made through zones composed of the paper backing 10¹ and the vulcanizable material 24, but such zones are free from the bonding material or adhesive applied by the device 11.

The flat bags thus formed may be stacked, bundled or otherwise handled. It is to be noted that the tacky non-drying adhesive which is ordinarily employed does not extend to the edges of the bag and therefore there is no leakage of such adhesive from the cut edges of the bag. In the event the adhesive were applied to the entire surface of the fibrous backing sheet 10', then upon being folded and cut the bags would leak around the cut edges and the tacky adhesive would render stacking of the bags or handling of the bags in automatic machinery impractical and virtually impossible. By reason of the steps employed during manufacture and described hereinabove, these disadvantages are not found in the bags of the present invention.

A finished bag is indicated in Fig. 7 and it is to be noted that one edge 33 extends beyond the other edge 34. Along the only open end of the bag, vulcanized seams are indicated at 42 and 43 whereas the folded edge is indicated at 44. In forming and filling, the exposed or extending edge 33 is of value since a blast of air, as for example through a suitable nozzle 45, will readily open the bag into the position shown in Fig. 8. The partially opened bag of Fig. 8 readily receives a forming mandrel or fingers. The partly opened bag of Fig. 8 can then be readily converted into the formed container illustrated in Fig. 9. The container of Fig. 9 is provided with a liner composed of the rubber composition (such as Pliofilm) and an outer fibrous covering, the liner being bonded to the fibrous covering by means of the adhesive cement.

I claim:

1. A continuous strip adapted for use in the formation of bag-like containers, comprising a strip of fibrous material, a strip of sheet rubber in vulcanizable form adhering to one surface of said fibrous strip, and areas of adhesive connecting said rubber strip to said fibrous strip, each of said areas of said adhesive being substantially coextensive with the sides of the bag-like container to be formed, said areas being spaced from each other by narrow transversely extending strips.

2. A continuous strip adapted for use in the formation of bag-like containers, comprising a strip of fibrous material, a strip of vulcanizable rubber composition applied to one surface of said fibrous strip, and areas of adhesive connecting said rubber strip to said fibrous strip, each of said areas of said adhesive being substantially coextensive with the sides of the bag-like container to be formed, said areas of adhesive being separated by narrow areas free from adhesive and extending transversely of said continuous strip, said areas of adhesive being spaced from the longitudinal edges of said strip.

3. A method of making composite lined bag-like containers which comprises: coating a continuous strip of fibrous material with transversely extending areas of adhesive separated by narrow uncoated areas, each of said areas of said adhesive being substantially coextensive with the sides of the bag-like container to be formed, applying a continuous strip of vulcanizable composition to the coated side of said fibrous strip, folding the resulting combined strip upon itself to place the composition in contact with itself, applying heat to said folded strip along transversely extending areas corresponding to areas uncoated with adhesive, and cutting said heat-treated folded strip through said heat-treated and uncoated areas to form a folded bag.

4. A method of making composite lined bag-like containers which comprises: coating a continuous strip of fibrous material with transversely extending areas of adhesive separated by narrow uncoated areas, each of said areas of said adhesive being substantially coextensive with the sides of the bag-like container to be formed, applying a continuous strip of vulcanizable rubber to the coated side of said fibrous strip, folding the resulting combined strip upon itself to place the rubber in contact with itself while leaving one edge extending beyond the other, applying heat to said folded strip along transversely extending areas corresponding to areas uncoated with adhesive, and cutting said heat-treated folded strip through said heat-treated and uncoated areas to form a folded bag.

5. A method of making composite lined bag-like containers which comprises: coating a continuous strip of fibrous material with transversely extending areas of adhesive separated by narrow transverse uncoated areas and spaced from the edges of said strip; applying a continuous strip of vulcanizable rubber to the coated side of said fibrous strip; folding the resulting combined strip upon itself along a fold parallel to the axis of the strip to place the rubber in contact with itself while leaving one edge of said strip extending beyond the other; applying heat and pressure to said folded strip along transversely extending areas corresponding to uncoated areas, and cutting said heat-treated folded strip through said heat-treated and uncoated areas to form folded bag-like containers.

6. A continuous strip adapted for use in the formation of bag-like containers, comprising: a strip of fibrous material, a strip of material capable of bonding together under the influence of heat adhering to one surface of said fibrous strip, and areas of adhesive connecting said heat-bonded material to said fibrous strip, each of said areas being substantially coextensive with the sides of the bag-like container to be formed and spaced from each other by narrow transversely extending areas free from adhesive.

7. A method of making composite lined bag-like containers which comprises: coating a continuous strip of fibrous material with transversely extending areas of adhesive spaced from the edge of said strip and separated from each other by narrow transverse uncoated areas; applying to the coated side of said fibrous strip a continuous strip of material capable of bonding together under the influence of heat; folding the resulting combined strip upon itself along a fold parallel to the axis of the strip to place the heat bonding material in contact with itself while leaving one edge of said strip extending slightly beyond the other; applying heat and pressure to said folded strip along limited, transversely extending areas corresponding to areas uncoated with adhesive, and cutting the folded and heat-treated strip through the heat-treated areas to form flat bag-like containers.

DON RAY.